(12) United States Patent
Chang et al.

(10) Patent No.: US 8,345,210 B2
(45) Date of Patent: Jan. 1, 2013

(54) GATE SIGNAL TRANSMISSION CIRCUIT STRUCTURE

(75) Inventors: Kai-Ting Chang, Taipei County (TW); Han-Tung Hsu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 279 days.

(21) Appl. No.: 12/788,289

(22) Filed: May 26, 2010

(65) Prior Publication Data

US 2011/0248908 A1  Oct. 13, 2011

(30) Foreign Application Priority Data

Apr. 13, 2010  (TW) .............................. 99206620 U

(51) Int. Cl.
*G02F 1/1345* (2006.01)

(52) U.S. Cl. .......... 349/151; 349/84; 349/139; 349/149; 349/155; 349/156

(58) Field of Classification Search ............... 349/56, 349/84, 139, 149, 151, 155, 156
See application file for complete search history.

(56) References Cited

U.S. PATENT DOCUMENTS

| 5,593,903 A * | 1/1997 | Beckenbaugh et al. ........ 438/18 |
| 2010/0177155 A1 * | 7/2010 | Kii ................................. 347/224 |

* cited by examiner

*Primary Examiner* — Jennifer Doan
(74) *Attorney, Agent, or Firm* — Jianq Chyun IP Office

(57) ABSTRACT

A gate signal transmission circuit structure is provided which is disposed on a peripheral circuit region of a display panel and includes at least a driver bonding pad, at least a transmission line and a plurality of connection lines. The transmission line is disposed around the driver bonding pad. The connection lines are connected between the driver bonding pad and the transmission line, wherein a plurality of holes exist between the connection lines, and the thickness of each connection line is substantially the same as the thickness of the transmission line.

10 Claims, 5 Drawing Sheets

GATE SIGNAL TRANSMISSION CIRCUIT STRUCTURE

CROSS-REFERENCE TO RELATED APPLICATION

This application claims the priority benefit of Taiwan application serial no. 99206620, filed on Apr. 13, 2010. The entirety of the above-mentioned patent application is hereby incorporated by reference herein and made a part of specification.

BACKGROUND OF THE INVENTION

1. Field of the Utility Model

The present invention generally relates to a signal transmission circuit structure, and more particularly, to a gate signal transmission circuit structure disposed on a peripheral circuit region of a display panel.

2. Description of Related Art

Along with the rapid progress of the image display technology, a common TV set or a computer monitor has evolved to the current liquid crystal display (LCD) from the cathode ray tube (CRT) display. A liquid crystal display panel (LCD panel) employed by an LCD is usually composed of an active device array substrate, an opposite substrate and a liquid crystal layer disposed between the above-mentioned two substrates. In addition, sealant is used to adhere the two substrates to avoid the liquid crystal from flowing out.

In general speaking, an active device array substrate can be divided into an active region and a peripheral circuit region. A plurality of pixels are disposed in the active region to form a pixel array, while a peripheral circuit is disposed in the peripheral circuit region, wherein each pixel includes a thin film transistor (TFT) and a pixel electrode connected to the TFT, and each pixel is enclosed by and electrically connected to two adjacent scan lines and two adjacent data lines. These scan lines and data lines extend from the active region to the peripheral circuit region so as to connect the above-mentioned peripheral circuit. Further, the peripheral circuit is connected to an external driver IC so as to drive the pixels in the active region.

The peripheral circuit includes a plurality of driver bonding pads and a plurality of transmission lines directly electrically connected to the driver bonding pads. The driver bonding pad is mostly composed of a plurality of pads comprising a plurality of metal layers and insulation layers stacked by each other and a patterned transparent conductive layer overlaying the pads. During forming the peripheral circuit, it is required to fabricate the patterned transparent conductive layer overlaying the pads so that an etching liquid with corrosive is used to perform a patterning process on the transparent conductive layer. However, during performing the patterning process, it often produce transition etching or corrosion on the pads under the transparent conductive layer, and meanwhile, it may directly lead to corrosion on the transmission lines connected to the driver bonding pads. Moreover, when or after other processes, the influence of the external environment may also cause corrosion (by, for example, high temperature or high moisture). When the corrosion area is too large, an abnormal signal is produced, which further affects the display quality of the display panel.

SUMMARY OF THE UTILITY MODEL

Accordingly, the present invention is directed to a gate signal transmission circuit structure with better reliability.

The present invention provides a gate signal transmission circuit structure, which is disposed on a peripheral circuit region of a display panel and includes at least a driver bonding pad, at least a transmission line and a plurality of connection lines. The transmission line is disposed around the driver bonding pad. The connection lines are connected between the driver bonding pad and the transmission line, wherein a plurality of holes exist between the connection lines, and the thickness of each connection line is substantially the same as the thickness of the transmission line.

In an embodiment of the present invention, the area of each of the above-mentioned connection lines is less than the area of the driver bonding pad or the area of the transmission line.

In an embodiment of the present invention, the above-mentioned connection lines form a net-like connection structure.

In an embodiment of the present invention, the above-mentioned transmission line includes a first transmission portion and a second transmission portion, wherein the first transmission portion is disposed between the connection lines and the second transmission portion, and the first transmission portion is connected to the connection lines and the second transmission portion.

In an embodiment of the present invention, the above-mentioned first transmission portion includes a net-like transmission line.

In an embodiment of the present invention, the shape of each of the above-mentioned holes includes rectangular, square, rhombus, circle or ellipse.

In an embodiment of the present invention, the above-mentioned transmission line includes a bimetal layer structure.

In an embodiment of the present invention, the material of the above-mentioned connection lines is the same as the material of the transmission line.

In an embodiment of the present invention, the above-mentioned driver bonding pad is composed of a first metal layer, a first insulation layer, a second metal layer, a second insulation layer and a third metal layer stacked by each other sequentially. The first insulation layer has at least a first opening, the third metal layer is electrically connected to the first metal layer through the first opening, the second insulation layer has at least a second opening, and the third metal layer is electrically connected to the second metal layer through the second opening.

In an embodiment of the present invention, the material of the above-mentioned third metal layer includes indium tin oxide (ITO) or indium zinc oxide (IZO).

Based on the depiction above, the present invention uses a plurality of connection lines to connect the driver bonding pad and the transmission line, wherein a plurality of holes exist between the connection lines. In comparison with the prior art where the driver bonding pad is directly connected to the transmission line, the present invention can reduce the corroded area of the transmission line in the processes, which further increases the reliability of the gate signal transmission circuit structure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
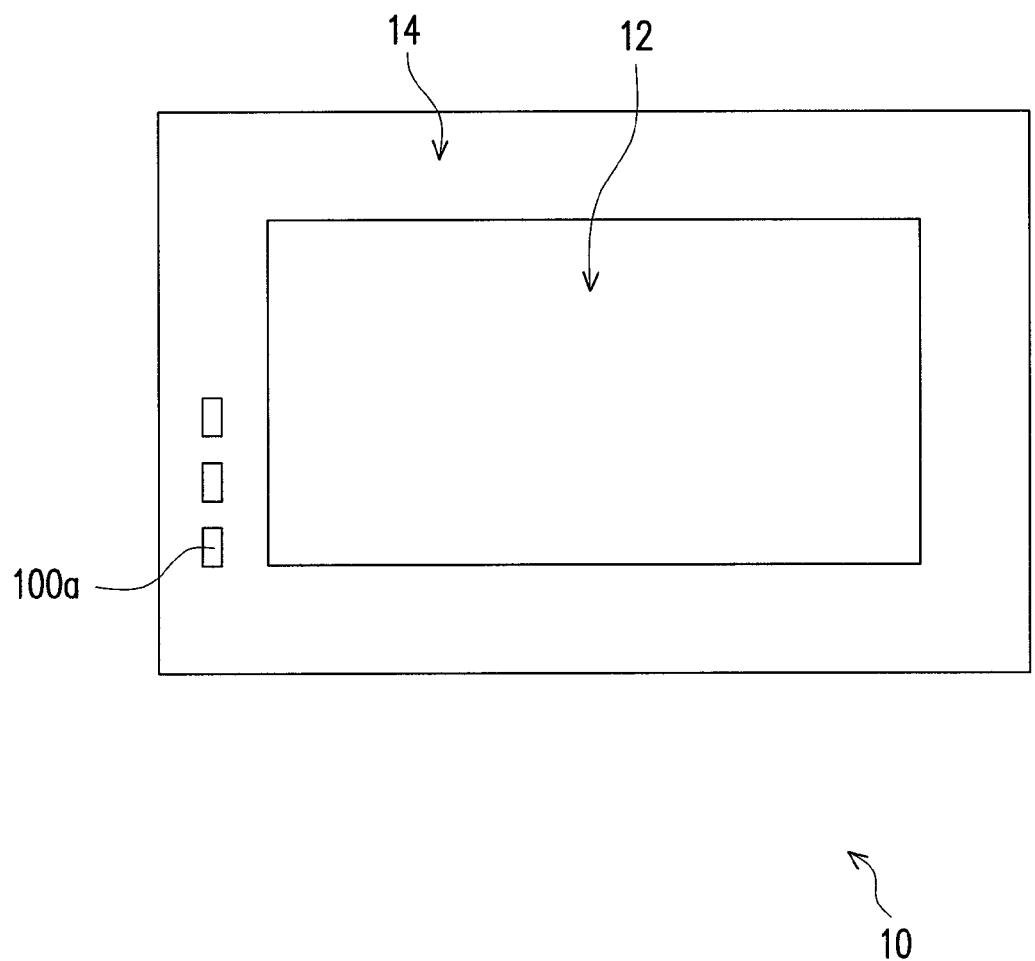
FIG. 1 is a diagram where a gate signal transmission circuit structure of an embodiment of the present invention is disposed on a peripheral circuit region of a display panel.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
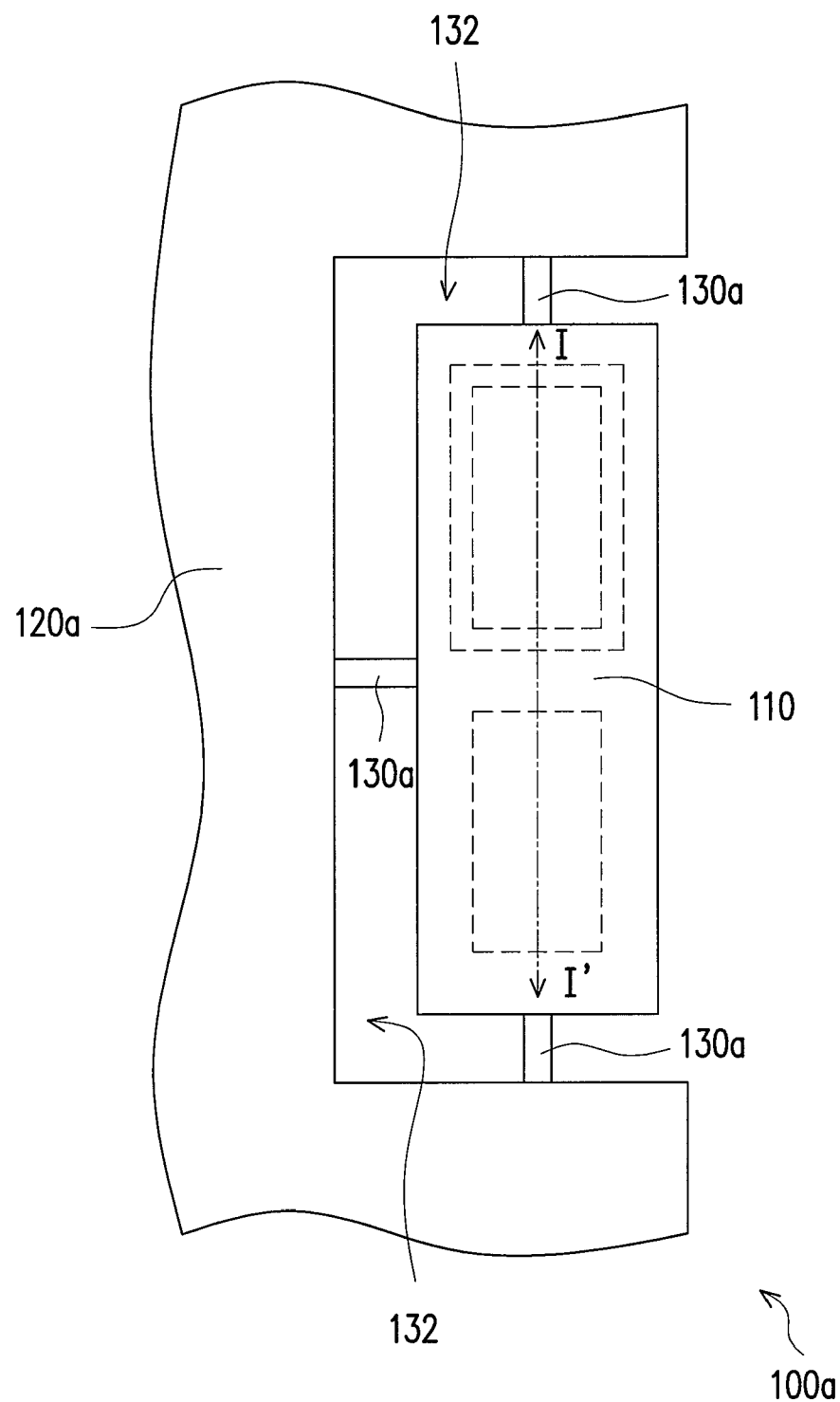
FIG. 2A is a localized enlarged diagram of the gate signal transmission circuit structure of FIG. 1.
Figure 2B:
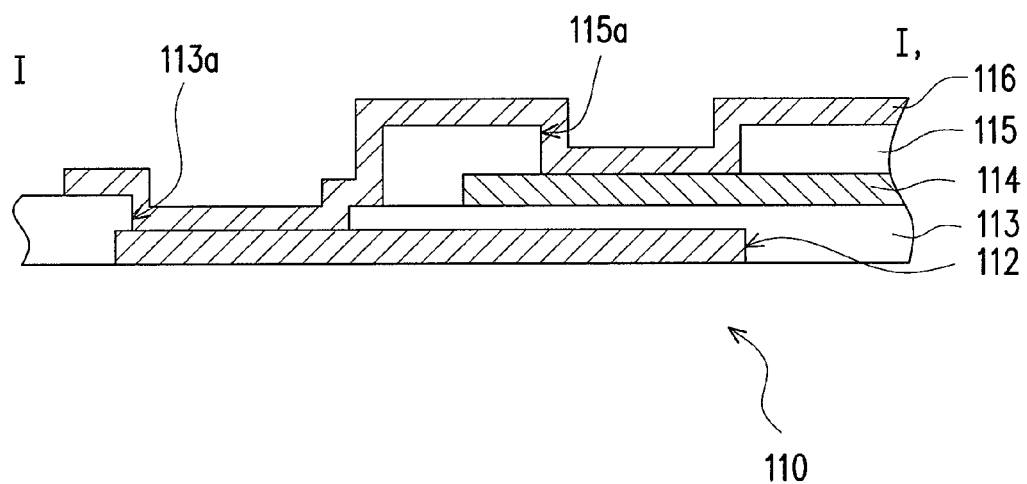
FIG. 2B is a sectional diagram of the structure of FIG. 2A along line I-I'.

FIG. 1 is a diagram where a gate signal transmission circuit structure of an embodiment of the present invention is disposed on a peripheral circuit region of a display panel, FIG. 2A is a localized enlarged diagram of the gate signal transmission circuit structure of FIG. 1 and FIG. 2B is a sectional diagram of the structure of FIG. 2A along line I-I'. Referring to FIG. 1, in the embodiment, a gate signal transmission circuit structure 100a is suitable to be disposed on a display panel 10, wherein the display panel 10 includes an active region 12 and a peripheral circuit region 14 surrounding the active region 12, while the gate signal transmission circuit structure 100a is located on the peripheral circuit region 14.

In more details, referring to FIG. 2A, the gate signal transmission circuit structure 100a includes at least a driver bonding pad 110, at least a transmission line 120a and a plurality of connection lines 130a. The transmission line 120a is disposed around the driver bonding pad 110. The connection lines 130a are connected between the driver bonding pad 110 and the transmission line 120a, wherein a plurality of holes 132 exist between the connection lines 130a, and the thickness of each connection line 130a is substantially the same as the thickness of the transmission line 120a.

Moreover, referring to FIG. 2B, the driver bonding pad 110 of the embodiment is composed of a first metal layer 112, a first insulation layer 113, a second metal layer 114, a second insulation layer 115 and a third metal layer 116 stacked by each other sequentially. The first insulation layer 113 herein has at least a first opening 113a, and the third metal layer 116 is electrically connected to the first metal layer 112 through the first opening 113a. The second insulation layer 115 has at least a second opening 115a, and the third metal layer 116 is electrically connected to the second metal layer 114 through the second opening 115a. In addition, the material of the third metal layer 116 is, for example, indium tin oxide (ITO) or indium zinc oxide (IZO).

In particular in the embodiment, the area of each connection line 130a is less than the area of the driver bonding pad 110 or the area of the transmission line 120a. The shape of each connection line 130a is, for example, a slender rectangular, while the shape of each hole 132 is, for example, a polygon. The transmission line 120a of the embodiment is, for example, a bimetal layer structure, wherein the material of the bimetal layer structure is the same as the material of the first metal layer 112 and the second metal layer 114 of the driver bonding pad 110. For example, the transmission line 120a is a bimetal layer structure with the material of, for example, an aluminium-chrome bimetal. In other embodiments however, other bimetals can be adopted, which the present invention is not limited to. The material of the connection lines 130a is substantially the same as the material of the transmission line 120a. In other words, the connection lines 130a can be a bimetal layer structure as well; in the embodiment, the third metal layer 116 overlays the driver bonding pad 110 only.

Since the embodiment uses a plurality of connection lines 130a to connect the driver bonding pad 110 and the transmission line 120a, wherein a plurality of holes 132 exist between the connection lines 130a, so that during fabricating the third metal layer 116, the situation can be effectively reduced that the etching liquid with corrosive used during performing a patterning process or other processes may corrodes the transmission line 120a when the etching liquid flows along the connection lines 130a. Meanwhile, the corrosion caused by the influence of the external environment after the processes can be reduced too. In comparison with the prior art where the driver bonding pad is directly connected to the transmission line, the present embodiment can effectively reduce the corrosion of the transmission line 120a, i.e., the corroded area of the transmission line 120a can be reduced. In this way, it is assured to make the transmission line 120a have normal transmission signal function, which further increases the reliability of the gate signal transmission circuit structure 100a.

A plurality of different embodiments are explained in follows to instruct the design of two gate signal transmission circuit structures 100b and 100c.

Figure 3:
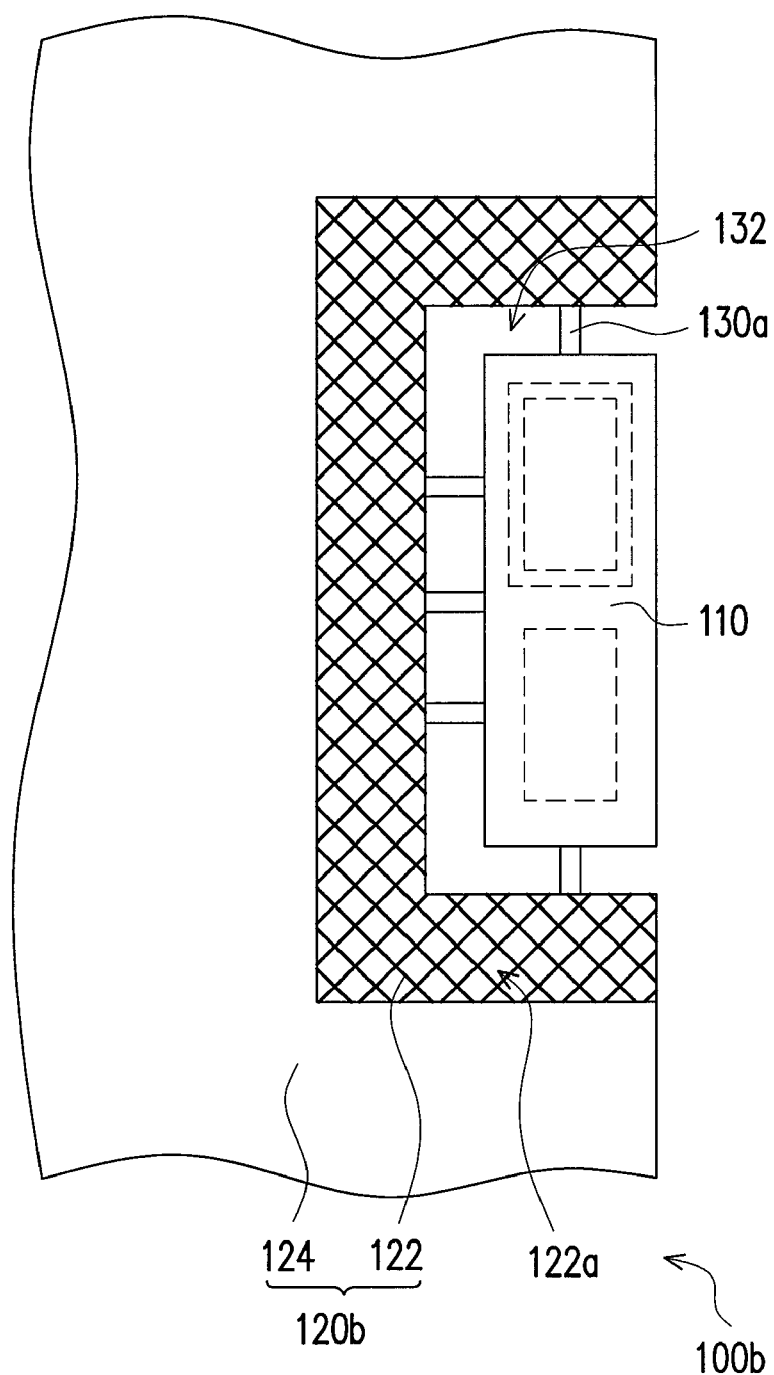
FIG. 3 is a localized diagram of a gate signal transmission circuit structure according to another embodiment of the present invention.

FIG. 3 is a localized diagram of a gate signal transmission circuit structure according to another embodiment of the present invention. Referring to FIGS. 2A and 3, in the embodiment, the gate signal transmission circuit structure 100b of FIG. 3 is similar to the gate signal transmission circuit structure 100a of FIG. 2A and the partial portions thereof are indicated with the same marks as the ones of FIG. 2A. The difference rests in that the transmission line 120b of the gate signal transmission circuit structure 100b includes a first transmission portion 122 and a second transmission portion 124.

In more details, the first transmission portion 122 is disposed between the connection lines 130a and the second transmission portion 124, and the first transmission portion 122 connects the connection lines 130a and the second transmission portion 124. In particular in the embodiment, the first transmission portion 122 is for example, a net-like transmission line, i.e., the first transmission portion 122 is not a solid transmission line and has a plurality of holes 122a, but the second transmission portion 124 is, for example, a solid transmission line. The shape of the holes 122a is, for example, a square. However in other unshown embodiments, the shape of the holes 122a can include circle, ellipse, polygon (for example, rectangular or rhombus) or other irregular shapes, which the present invention is not limited to.

The transmission line 120b of the embodiment has the first transmission portion 122 with net-like shape and the solid second transmission portion 124, and the connection lines 130a are used to connect the driver bonding pad 110 and the transmission line 120b, wherein there are the holes 132 between the connection lines 130a. Therefore, during fabricating the third metal layer 116, the situation can be further reduced that the etching liquid with corrosive used during performing a patterning process or other processes may flow along the connection lines 130a and the first transmission portion 122 so as to corrode the second transmission portion 124. Meanwhile, the corrosion caused by the influence of the external environment after the processes can be reduced too.

That is to say, the embodiment uses the connection lines 130*a* and changes the form of the transmission line 120*b* to reduce the corroded area of the transmission line 120*b*. In this way, it can be avoided that the transmission line 120*b* may be broken due to corrosion to thereby fail transmitting signals. In comparison with the prior art where the driver bonding pad is directly connected to the transmission line, the present embodiment can effectively reduce the corroded area of the transmission line 120*b*, and further increase the reliability of the gate signal transmission circuit structure 100*b*.

Figure 4:
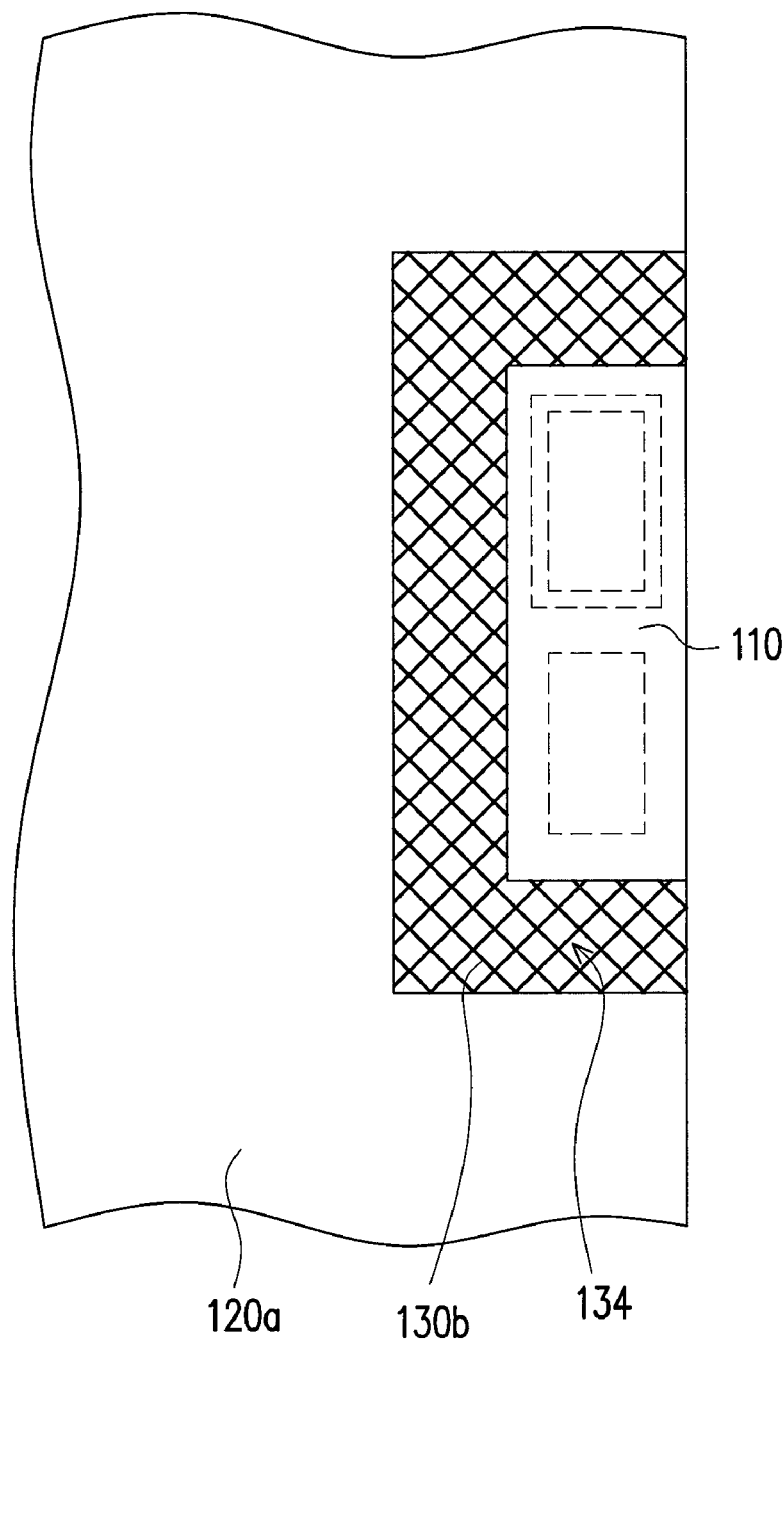
FIG. 4 is a localized diagram of a gate signal transmission circuit structure according to yet another embodiment of the present invention.

FIG. 4 is a localized diagram of a gate signal transmission circuit structure according to yet another embodiment of the present invention. Referring to FIGS. 2A and 4, in the embodiment, the gate signal transmission circuit structure 100*c* of FIG. 4 is similar to the gate signal transmission circuit structure 100*a* of FIG. 2A and the partial portions thereof are indicated with the same marks as the ones of FIG. 2A. The difference rests in that the holes 134 of the gate signal transmission circuit structure 100*c* in FIG. 4 existing between the connection lines 130*b* are respectively less than the holes 132 of the gate signal transmission circuit structure 100*a* existing between the connection lines 130*a*.

In more details, in the embodiment, the connection lines 130*b* can be seen as a net-like connection structure. The embodiment uses the net-like connection structure to connect the driver bonding pad 110 and the transmission line 120*a* so that during fabricating the third metal layer 116, the embodiment has advantages that it can effectively reduce the produced corrosion of the transmission line 120*a*, i.e., reduce the corroded area of the transmission line 120*a*, which further increases the reliability of the gate signal transmission circuit structure 100*c* and effectively reduces the resistive impedance.

In summary, the present invention uses a plurality of connection lines for connecting the driver bonding pad and the transmission line, wherein a plurality of holes exist between the connection lines. In comparison with the prior art where the driver bonding pad is directly connected to the transmission line, the present embodiment can effectively reduce the corroded area of the transmission line and insure the transmission line normally transmitting signals, which further increases the reliability of the gate signal transmission circuit structure.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention.

What is claimed is:

1. A gate signal transmission circuit structure, disposed on a peripheral circuit region of a display panel and comprising:
    at least a driver bonding pad;
    at least a transmission line, disposed around the driver bonding pad; and
    a plurality of connection lines, connected between the driver bonding pad and the transmission line, wherein a plurality of holes exist between the connection lines, and the thickness of each connection line is substantially the same as the thickness of the transmission line.

2. The gate signal transmission circuit structure as claimed in claim 1, wherein the area of each of the connection lines is less than the area of the driver bonding pad or the area of the transmission line.

3. The gate signal transmission circuit structure as claimed in claim 1, wherein the connection lines form a net-like connection structure.

4. The gate signal transmission circuit structure as claimed in claim 1, wherein the transmission line comprises a first transmission portion and a second transmission portion, the first transmission portion is disposed between the connection lines and the second transmission portion, and the first transmission portion is connected to the connection lines and the second transmission portion.

5. The gate signal transmission circuit structure as claimed in claim 4, wherein the first transmission portion comprises a net-like transmission line.

6. The gate signal transmission circuit structure as claimed in claim 1, wherein the shape of each of the holes comprises rectangular, square, rhombus, circle or ellipse.

7. The gate signal transmission circuit structure as claimed in claim 1, wherein the transmission line comprises a bimetal layer structure.

8. The gate signal transmission circuit structure as claimed in claim 7, wherein material of the connection lines is the same as the material of the transmission line.

9. The gate signal transmission circuit structure as claimed in claim 1, wherein the driver bonding pad is composed of a first metal layer, a first insulation layer, a second metal layer, a second insulation layer and a third metal layer stacked by each other sequentially, the first insulation layer has at least a first opening, the third metal layer is electrically connected to the first metal layer through the first opening, the second insulation layer has at least a second opening, and the third metal layer is electrically connected to the second metal layer through the second opening.

10. The gate signal transmission circuit structure as claimed in claim 9, wherein the material of the third metal layer comprises indium tin oxide (ITO) or indium zinc oxide (IZO).

* * * * *